United States Patent [19]

Lin et al.

[11] Patent Number: 4,818,506
[45] Date of Patent: Apr. 4, 1989

[54] GYPSUM SCALE INHIBITORS FOR FLUE GAS DESULFURIZATION SYSTEMS

[75] Inventors: Mei-jan L. Lin, Naperville; Richard J. Mouché, Batavia; Baker N. Nimry, Downers Grove; Dodd W. Fong, Naperville, all of Ill.

[73] Assignee: Nalco Chemical Company, Naperville, Ill.

[21] Appl. No.: 144,804

[22] Filed: Jan. 15, 1988

[51] Int. Cl.$^4$ .................. C01B 17/00; B01D 21/00
[52] U.S. Cl. .................. 423/242; 423/243; 210/700; 210/701
[58] Field of Search ............ 423/242 A, 242 R, 243, 423/244 A, 244 R; 210/700, 701

[56] References Cited

U.S. PATENT DOCUMENTS

| | | | |
|---|---|---|---|
| 3,477,956 | 11/1969 | Stanford et al. | 252/855 |
| 3,663,448 | 5/1972 | Ralston | 210/700 |
| 3,801,669 | 4/1974 | Arnold | 423/244 |
| 3,880,620 | 4/1975 | Lange et al. | 55/72 |
| 4,093,580 | 6/1978 | Jones et al. | 260/29.6 |
| 4,143,222 | 3/1979 | Goretta et al. | 526/64 |
| 4,171,292 | 10/1979 | Jones et al. | 260/29.6 |
| 4,331,792 | 5/1982 | Goretta et al. | 526/229 |
| 4,361,492 | 11/1982 | Dublin | 210/701 |
| 4,432,884 | 2/1984 | Kawasaki et al. | 210/701 |
| 4,555,392 | 11/1985 | Steinberg | 423/244 |
| 4,566,973 | 1/1986 | Masler, III et al. | 210/701 |
| 4,605,740 | 8/1986 | Landscheidt | 544/376 |
| 4,623,523 | 11/1986 | Abrams et al. | 423/242 |
| 4,626,418 | 12/1986 | College et al. | 423/243 |
| 4,703,092 | 10/1987 | Fong | 525/351 |
| 4,707,271 | 11/1987 | Amjad et al. | 210/701 |

OTHER PUBLICATIONS

Amjad, Z. et al., "The Inhibition of Calcium Sulfate Dihydrate Crystal Growth by Polyacrylates and the Influence of Molecular Weight", Corrosion 85, Paper No. 357, Mar. 25-29, 1985.

Amjad, Z. et al., "Influence of Polyelectrolytes on the Crystal Growth of Calcium Sulfate Dihydrate", Journal of Colloid and Interface Science III, No. 2, Jun., 1986, p. 496.

*Primary Examiner*—Gregory A. Heller
*Attorney, Agent, or Firm*—Willian Brinks Olds Hofer Gilson & Lione Ltd.

[57] ABSTRACT

Gypsum scale inhibitors useful under wet flue gas desulfurization (FGD) scrubber temperature and pH conditions. The gypsum inhibitors advantageously prevent or minimize gypsum scale formation and crystal growth in mist eliminator wash water and in the scrubber internals. Specific inhibitors contemplated include copolymers of modified acrylic acid/acrylamide; acrylic acid/vinyl acetate; acrylic acid/maleic anhydride; acrylic acid/acrylate ester; and combinations thereof. In addition, gypsum scale inhibitors comprising phosphonate-polymer blends of hexamethylene diamine tetra (methylene phosphonic acid) salts and polymaleate, poly(acrylic acid/ethylacrylate), poly(acrylic acid/N-methoxypropyl acrylamide/acrylamide), poly(acrylic acid/N-propyl acrylamide/acrylamide), and combinations thereof are also contemplated.

46 Claims, No Drawings

GYPSUM SCALE INHIBITORS FOR FLUE GAS DESULFURIZATION SYSTEMS

BACKGROUND OF THE INVENTION

The present invention relates to gypsum scale inhibiting compounds and their use in flue gas desulfurization (FGD) systems.

The formation of calcium sulfate and scale inhibition has been studied in connection with desalination, petroleum, geochemistry, and cooling water processes. Because high amounts of calcium sulfate and calcium sulfite are major reaction products in the removal of sulfur dioxide, recent research has focused on the inhibition of scale formation in FGD systems.

In general, wet FGD scrubbers remove sulfur from flue gas by contacting the gas with water in an absorber. The dirty water is slurried in a reaction tank, thickened and then hardened for land fill. In a wet FGD scrubbing process, limestone ($CaCO_3$) or lime ($CaO$ or $Ca(OH)_2$) reagent reacts in the absorber with sulfur dioxide containing flue gas to produce calcium sulfite hemihydrate ($CaSO_3 \cdot \frac{1}{2} H_2O$) and calcium sulfate, present as gypsum ($CaSO_4 \cdot 2H_2O$). These solids plate out or form scale within the FGD unit. For example, scale has been found in the absorber, mist eliminators, slurry reaction tank, transfer lines, pump parts, valves, reheaters and induced-draft fans of FGD scrubbers.

Calcium sulfite hemihydrate scale is typically soft and generally may be removed by either reducing slurry pH or hydroblasting the unit with water. Gypsum scale, however, is much harder and is very difficult to remove. Gypsum scale is very prominent in limestone systems since limestone's low solubility requires a large excess amount of limestone reagent for sulfur dioxide removal. In addition, gypsum scale is severe in forced-oxidation FGD units where sulfite is converted to sulfate by bubbling oxygen through the absorber slurry.

Mist eliminators are also an integral part of wet scrubber FGD systems. They are used to remove drift or mist from the flue gas as it leaves the scrubber. The liquid mist droplets are comprised of reagent recirculating slurry which is usually made of reagent limestone or lime, containing 5 to 15 percent suspended solids. The slurry is also saturated with calcium sulfate dihydrate (gypsum) and calcium sulfite upon contact with flue gas.

When the drift particles are removed from the gas stream by the mist eliminator, the solid phase of the drift tends to deposit on the mist eliminator baffle slats and the liquid portion gathers into larger droplets and falls back into the slurry tank. This allows the build up of solids which if allowed to remain, degrades the performance of the mist eliminators making removal difficult.

Performance of the mist eliminator for removing small drift particles is important. If unsatisfactory, solids will build up in the down-stream flue gas ducts, in the bottom of the stack, or on the reheater which will impede heat transfer. As the deposits build up on the mist eliminators the gap between the slats is decreased, causing a reduced amount of open area for the flue gas to pass. This causes an increase in gas velocity away from the design velocity resulting in smaller particles not impacting the eliminator blades and not being removed. Furthermore, the deposits will plug the mist eliminator to the point that the induced draft fan cannot remove the flue gas at the required rate, causing the system to be shut down for cleaning.

Hardening of the deposits on the mist eliminators is thought to be caused by a number of reasons. These include supersaturated water chemistry in the drift particles with respect to calcium and sulfate, undissolved lime or limestone particles which deposit on the eliminators from the drift then slowly dissolve causing localized high calcium or pH conditions, or high calcium sulfite slurry drift depositing and slowly oxidizing to gypsum.

To prevent these solids from building up on the mist eliminators, scrubbers have mist eliminator wash systems. Most of the mist eliminators are washed intermittently, as opposed to continuously, due to water requirements and restrictions. Even with the continuous wash systems deposits still build up in many systems, usually forming a hard scale, requiring the system to eventually be shut down for cleaning. Sometimes poor quality wash water is used which only compounds the problem. Accordingly, means for inhibiting gypsum scale formation especially in FGD mist eliminators are needed in the art.

Generally, inhibition is accomplished by dispersing the particulate matter which forms the scale in the medium containing such matter, or controlling precipitate forming ions under conditions in which precipitation would be expected.

U.S. Pat. No. 4,566,973 discloses reducing or inhibiting formation and deposition of scale in a water system with copolymers of an acrylic acid and a substituted acrylamide. The copolymers have a molecular weight in the range of about 1,000 to 50,000. This method, however, only inhibits the formation of phosphate scale.

U.S. Pat. No. 3,880,620 discloses scrubbing flue gases from a blast furnace for iron production with an aqueous medium containing a compound comprising an organo-phosphonate and a water soluble acrylic acid polymer.

However, good calcium phosphate scale inhibitors have not necessarily been found to be good calcium sulfate scale inhibitors, and vice versa. Phosphate scale forms at solution pH higher than the typical operating pH of 4.5 to 6.5 of an FGD scrubber slurry where gypsum formation is common.

Hexamethylene diamine tetra (methylene phosphonic acid) salts ("phosphonates") and low molecular weight polyacrylates, such as those known as Dequest, Goodrite K-752 and Acrysol LMW-10X are known to influence the precipitation of well defined seeded gypsum crystals.

A commonly known phosphonate, Dequest 2054, is a potassium salt of hexamethylene diamine (25% active acid) tetra (methylene phosphonic acid) having the following formula:

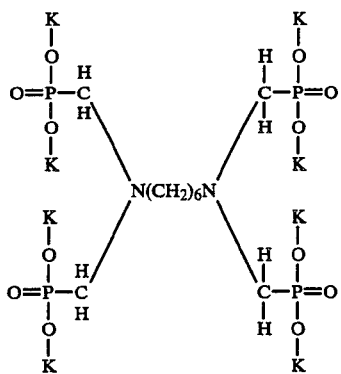

(I)

Polyacrylates are known to have the following general formula:

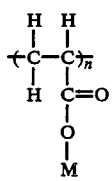

(II)

Where n is an integer sufficiently large in number so as to achieve a weight average molecular weight between about 1,000 and about 50,000, and M is H, an alkali metal, an alkaline earth metal, a transition metal, $NH_4$, a $C_1$-$C_4$ alkyl and the like, or a mixture thereof.

In FGD systems, gypsum scaling conditions vary between a saturation index value of about 1 and about 10. But, little is known about the potential influence of these compounds in bulk, high concentration gypsum solutions.

New compounds and compositions of matter which economically inhibit or preclude the formation of gypsum scale in FGD systems would provide a noticeable advance in the art, be widely accepted, and enjoy extensive commercial success. It is therefore an object of the present invention to provide compounds and compositions of matter that would inhibit the formation of gypsum scale in bulk gypsum solutions, and specifically in FGD systems. It is further an object of the present invention to provide a process for inhibiting the formation of gypsum scale in FGD systems by carrying out the FGD process in the presence of gypsum scale inhibitors. Other objects apparent from the specification are also contemplated. It is to be understood, however, that these objectives are not to be considered a limitation of the present invention, the spirit and scope of which is delineated in the appended claims.

SUMMARY OF THE INVENTION

In accordance with various embodiments the present invention provides compositions of matter for inhibiting the formation of gypsum scale in a gypsum containing aqueous medium. Specific gypsum containing aqueous mediums contemplated include bulk gypsum containing mediums commonly present in FGD processes and the like. The inhibiting compositions ("inhibitors") include phosphonate-polymer blends and polyacrylate-based copolymers or terpolymers. Specific phosphonate-polymer blends include but are not limited to blends of hexamethylene diamine tetra(methylene phosphonic acid) salts and polymaleate, poly(acrylic acid/ethylacrylate), poly(acrylic acid/acrylamide/N-methoxypropyl acrylamide), poly(acrylic acid/acrylamide/N-propyl acrylamide), and combinations thereof.

Specific polyacrylate-based polymers include but are not limited to acrylic acid/acrylamide, acrylic acid/vinyl acetate, acrylic acid/acrylate ester, acrylic acid/maleic acid polymers and combinations thereof.

The present invention further provides a method for inhibiting the formation of gypsum scale in an FGD process comprising contacting a sulfur-containing flue gas with an aqueous medium containing at least one or more of the above inhibitors under FGD conditions.

DESCRIPTION OF THE PRESENTLY PREFERRED EMBODIMENTS

In accordance with the present invention it has now been discovered that maintaining the presence of gypsum inhibitors comprising modified polyacrylate-based polymers, phosphonate-polymer blends and combinations thereof inhibit the formation of gypsum scale in gypsum containing aqueous solutions present in FGD systems and like processes. One advantage which accrues from this invention is that FGD units operate more efficiently and economically. The unit can be run for longer periods of time because it does not have to be shut down for gypsum scale removal. Further, the absence of gypsum scale in the unit keeps the unit surfaces clean providing better efficiency In a typical FGD process, the gypsum containing aqueous medium has a pH between about 4.5 and about 11. The amount of gypsum present in the aqueous medium may be between about 0.3 and about 30 weight percent while the temperature of the aqueous medium is generally between about 80° F. and about 150° F.

In general the inhibitors of the present invention should be maintained in the aqueous medium at a concentration range of about 0.04 to about 120 parts per million by weight (ppm). It is to be understood however that the exact concentration ranges of the individual inhibitors described herein will vary with the type of inhibitor and the particular FGD process conditions.

In accordance with one embodiment, the present invention provides gypsum scale inhibitors comprising modified polyacrylate-based copolymers or terpolymers. Specific inhibitors contemplated include copolymers of acrylic acid and modified acrylamide; acrylic acid and modified acrylate, acrylic acid and vinyl acetate; acrylic acid and maleate; and combinations thereof.

In accordance with a further embodiment the present invention provides gypsum scale inhibitors comprising phosphonate polymer blends of hexamethylene diamine tetra(methylene phosphonic acid) salts and one or more polymers. The salts contemplated may include acid salts, metal salts or ammonium salts. Specific polymers contemplated include polymaleate, and acrylic acid/ethylacrylate, acrylic acid/N-methoxypropyl acrylamide, acrylic acid/N-propyl acrylamide/acrylamide polymers, and combinations thereof.

The gypsum scale inhibitors contemplated herein are useful in inhibiting the formation of gypsum scale found in FGD processes. Preferably, the inhibitors are added to and maintained in an FGD aqueous slurry or to mist eliminator wash water. The inhibitors may be added to and maintained in the slurry in any way commonly known in the art. Accordingly, the inhibitors may be added directly to the gypsum slurry or may be first dissolved in an appropriate solvent such as water with the resulting solution being added to the slurry. Those skilled in the art will recognize that the method of addition of the inhibitor to the slurry is not critical to the present invention. In addition, since FGD systems often recycle at least a portion of the aqueous medium, the inhibitors may be added as makeup to the recycle in varying proportions in order to maintain the desired inhibitor concentration.

Specific polyacrylate-based inhibitors contemplated by the present invention include those compounds of the following chemical formulas III to VII:

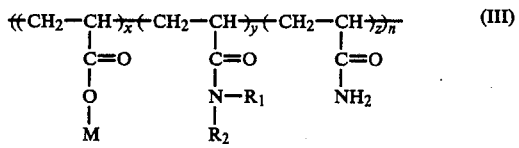
(III)

where $x+y+z=1$, x is between about 0.05 and about 0.95, y is between about 0.05 and about 0.95, and z is between about 0 and about 0.95; $R_1$ comprises H, an alkyl group containing from 1 to 4 carbon atoms, or $C_p(OH)_q$ where p is an integer from 1 to 4 and q is an integer from 1 to 3; $R_2$ comprises H or an alkyl group containing from 1 to 4 carbon atoms; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or a mixture thereof.

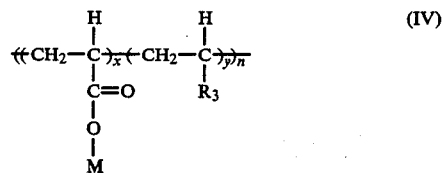
(IV)

where $x+y=1$, x is between about 0.05 and about 0.95, and y is about 0.05 and about 0.95; and $R_3$ comprises OH or

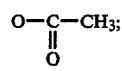

n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or mixture thereof.

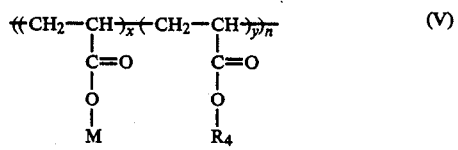
(V)

where $x+y=1$, x is between about 0.05 and about 0.95, and y is between about 0.05 and about 0.95; $R_4$ comprises $C_p(OH)_q$, where p is an integer from 1 to 4 and q is an integer from 1 to 3, or an alkyl group containing from 1 to 4 carbon atoms; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or mixture thereof.

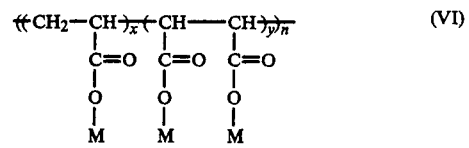
(VI)

where $x+y=1$, x is between about 0.05 and about 0.95, and y is between about 0.05 and about 0.95; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or mixture thereof.

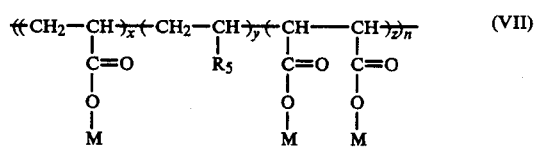
(VII)

where $x+y+z=1$, x is between about 0.05 and about 0.95, y is between about 0.05 and about 0.95, and z is between about 0.05 and about 0.95; $R_5$ comprises OH, $OCOCH_3$, $CH(OH)CH_2CH_3$, $CH_2CH(OH)CH_3$, $CH_2CH_2CH_2OH$, or $C_p(OH)_q$ where p is an integer from 1 to 4 and q is an integer from 1 to 3; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or mixture thereof.

In general, the polyacrylate based inhibitors comprise between about 5 to about 95 percent polymerized acrylate monomers. The polyacrylate based inhibitors further comprise between about 5 and 95 percent polymerized acrylate based monomers containing various functional group modifications. It has been found that the modification of various functional groups in polyacrylate based polymers, copolymers, and terpolymers provide chemical compositions which inhibit the formation of gypsum scale when added to and maintained in bulk gypsum containing aqueous mediums. Specifically, the present invention contemplates modification of the acrylate monomer with alkyl pending groups, hydroxyl groups, amide groups and combinations thereof. For example, monomers of N,N-dimethylacylamide, N-vinylpyrrolidone and isopropyl acrylate can be polymerized with acrylic acid to form copolymers having bulk gypsum scale inhibiting properties. Conversely, prepared polymers such as poly (acrylamide-acrylic acid) can be modified for example with appropriate primary amines such as 1-amine-2,3-dihydroxypropane to provide polymers having gypsum scale inhibiting properties.

In general, polymers prepared by polymerizing monomers in solution may be obtained by first adding the individual monomers to a reaction vessel and heating the monomer solution in an inert atmosphere. An initiator solution, for example, amonium persulphate and sodium metabisulfite is then added yielding an exothermic reaction. After the initial exothermic reaction subsides, the temperature is maintained at a steady level for a period of between 1 to 5 hours and then upon cooling, a slightly hazy solution results.

Polymers prepared by modifying prepared polymers may be obtained by any manner known in the art. Preferably, polymers containing pendant amide functional groups such as those derived from acrylamide are prepared in accordance with the teachings of U.S. Pat. No. 4,703,092, teachings of which are fully incorporated herein by reference. In general, the reaction is a transamidation reaction which substitutes an amide compound which may also contain other functional groups for the nitrogen portion of a pendant amide group contained on a polymeric backbone. The reaction conditions require that the polymers containing pendant amide groups be dissolved or readily dispersed in a solvent which is a common solvent for the chemical reactant. Common solvents include but are not limited to water, dimethylformamide, dimethylsulfoxide, ethanol, tertiary butanol and the like, and mixtures thereof. The dissolved pendant amide groups containing polymers and the reactants are then mixed and added to a pressure reaction vessel. The vessel is heated to a temperature of at least 100° C. and preferably at least 120° C. The pressure within the reaction vessel is a noncontrolled variable and may reach pressures of up to about 20 atmospheres. Those skilled in the art will understand that the vessel may contain solvents or reactants of various volatilities such that the vapor pressure of the solvents add reactants require pressurized vessels at the contemplated reaction temperatures. Once the reaction vessel contents have reached at least 100° C., reaction is allowed to occur for the length of time necessary to accomplish a sufficient percent conversion of the chemical reactants.

Specific phosphonate-polymer blends have also been found to possess gypsum scale inhibiting properties. Preferably, the phosphonates contemplated include salts of hexamethylene diamine, tetra(methylene phosphonic acid). These phosphonates are known to those skilled in the art as the Dequest series of compounds available from Monsanto. Most preferably, the compounds known as Dequst 2054 are blended with the polymers. The salts of the phosphonates may include acid salts, metal salts, ammonium salts or combinations thereof. The phosphonate-polymer blends comprise phosphonate in an amount between about 20 and about 80 weight percent and preferably between about 40 and about 60 weight percent.

The contemplated phosphonates may be blended with polymers to form the phosphonate-polymer blend in any way commonly known to those skilled in the art. Accordingly, the phosphonate and polymers may be blended in either the solid or liquid phase or a combination thereof. It is to be understood that the manner in which the phosphonate-polymer blend is formed is not critical to the invention.

The phosphonate-polymer blend inhibitor may comprise between about 80 and about 20 weight percent of the polymer and preferably between about 60 and about 40 weight percent. Specific polymers contemplated for blending to form the phosphonate-polymer inhibitor include polymaleate, acrylic acid/ethylacrylate copolymer, acrylic acid/N-methoxypropyl acrylamide copolymer, acrylic acid/N-propyl acrylamide copolymer, and combinations thereof.

The ethylacrylate copolymer may comprise between about 50 and about 95 weight percent acrylate and about 5 and about 50 weight percent ethylacrylate. The acrylic acid/N-methoxypropyl acrylamide copolymer may comprise between about 50 and about 95 weight percent acrylate and about 5 and about 50 weight percent N-methoxypropyl acrylamide. The acrylic acid/N-propyl acrylamide copolymer may comprise between about 50 and about 95 weight percent acrylic acid and about 5 to about 50 weight percent N-propyl acrylamide. The particular copolymers contemplated may be prepared by any manner known to those skilled in the art including those methods already discussed.

Preferably, the inhibitors are maintained in a gypsum containing aqueous medium having a pH in the range of about 4.5 to about 11 and most preferably in the range of about 4.5 and about 6.5. Preferably the temperature of the aqueous medium is between about 80° F. and about 150° F. and most preferably between about 100° F. and about 140° F. The average molecular weight of the polyacrylate-based inhibitors and of the polymers of the phosphonate-polymer blend is preferably between about 1,000 and about 50,000 and most preferably between about 1,000 and about 10,000 as measured by gel permeation chromatography in water.

It has been found that phosphonate structures, acrylate functionality in low molecular weight polymers (less than 10,000 molecular weight), maleate functionality in low molecular weight polymers and acrylate functionality modified by alkyl chains 1 to about 4 carbons in length alone or in combination with hydroxyl(s) and/or $-NH_2$ in low molecular weight polymers have a beneficial effect on gypsum scale inhibition.

Without being limited to theory, two general types of bonding play a role in gypsum inhibition. The first involves the affinity of the inhibitor toward the calcium cation while the second relates to the electrostatic interaction between the inhibitor and the anionic sulfate. In almost all cases it is believed that a chemical bond must be formed between the inhibitor and the calcium ion for effective inhibition.

Accordingly, the polyacrylate portion of the inhibitors complex the calcium ions by way of the carboxylate function. The complexing improves with modifications of the carboxylates such as the addition of hydroxyls and/or $-NH_2$. Also, the distance between the carboxylate pendent groups and the backbone appears to affect inhibition. Modification of carboxylate functionality with carbon alkyls of about 1 to about 4 in length have been found to provide optimum inhibition. When carbons exceed 6 in length or become aromatic, inhibition is greatly reduced.

It was found that performance of the inhibitors did not vary between a pH range of 4 to about 6. However, it was noted that gypsum inhibiting ability began to decrease at higher pH values of about 7.5 and greater for some molecules.

As compared to the phosphonate-polymer blend inhibitors, the polyacrylate-based inhibitors were just as effective at pH 6 and low gypsum saturation ratios but were less effective at pH 6 and higher gypsum saturation ratios. However, functional modification of the polymer, for example, with methoxypropylamine generally improve the performance of the polyacrylate-based inhibitors at pH 6 and higher gypsum saturation ratios. In addition, the polyacrylate-based inhibitors were more effective than the phosphonate-polymer blend inhibitors at a pH of 7.5 and greater.

Free magnesium ions were also found to have a beneficial effect on gypsum scale inhibition. Accordingly, the presence of magnesium ions in combination with the inhibitors of the present invention help to prevent the formation of gypsum scale. Without being limited to theory is believed that the presence of magnesium ions contributes to the formation of more soluble magnesium sulfite rather than the more insoluble calcium sulfite. However, it was also noted that the presence of silicate cancels any beneficial effect provided by free magnesium ions as magnesium silicate precipitation occurs at pH of 7.5 or greater.

The following examples are intended merely as an illustration of the present invention, the full scope and spirit of which is defined in the appended claims.

EXAMPLE 1

Various chemical compositions were prepared and tested for gypsum scale inhibition in a modified calcium sulfate NACE Standard TM-03-74 test procedure. The NACE procedure is recommended by the Technical Practices Committee for the testing of calcium carbonate and calcium sulfate precipitation. The details of the NACE procedure may be found in "Laboratory Screening Tests to Determine the Ability of Scale Inibitors to Prevent the Precipitation of Calcium Sulfate and Calcium Carbonate from Solution," NACE Standard TM-03-74, by the Technical Practices Committee, 1974.

The testing conditions were modified to simulate gypsum concentrations, pH and temperature conditions present in an FGD process. A typical procedure involved the preparation of calcium and sulfate brine solutions followed by adjustment to pH. Various concentrations of the brine solutions were prepared to provide an adequate gypsum concentration range. Specifically, brine solutions $1\times$, $2\times$, $3\times$ and $4\times$ had a gypsum saturation index (ratio) of 1.21, 3.42, 6.3, and 9.0 respectively. Brine solutions labelled $2\times$ were as follows: a calcium brine solution containing 7.5 g/liter NaCl and 22.6 g/liter $CaCl_2.2H_2O$, and a sulfate brine solution containing 7.5 g/liter NaCl and 21.32 g/liter $Na_2SO_4$. The $2\times$ brine gave 7550 ppm Ca as $CaCO_3$ after 1:1 dilution with the sulfate brine. The molar concentration of calcium was equivalent to that of sulfate. A nominal inhibitor dosage of 1 part active inhibitor to 1,000 part calcium as calcium carbonate was obtained by first adding 0.1 ml of inhibitor to a 4 oz. bottle. 50 ml of calcium brine was then added to the bottle followed by 50 ml of sulfate brine. After complete mixture, the bottle was placed in a 140° F. water bath for three days. The water bath was preferred over an oven because of a more uniform temperature distribution. After three days at 140° F., the bottle was taken from the water bath and 1 ml of the supernatant was immediately pipetted into 50 ml of deionized water. Care was taken not to disturb the bottle during this time in order to minimize dispersion of the solids within the solution. In addition, dilution of the sample was immediate since gypsum solubility changes with temperature. The diluted solution was then titrated by the well-known EDTA wet method of soluble calcium. The percent inhibition was then calculated by first subtracting the presence of soluble calcium in a blank from the sample and then dividing by the initial solubility of calcium in the sample after subtraction of calcium initially present in the blank. Accordingly, the results represent the inhibiting activity of an inhibitor relative to a blank sample which generally contained between about 2,750 to 3,000 ppm soluble calcium. The gypsum solid phase was identified by x-ray diffraction. The gypsum identified included both "scale" which is considered by some as being hard, adherent, heat transfer-hindering solids, and "precipitate." No differentiation was made between "scale" and "precipitate," the word "scale" being arbitrarily chosen. The invention therefore encompasses the inhibition of both.

EXAMPLE 2

A poly(acrylic acid/acrylamide/N-2,3-dihydroxypropyl acrylamide) was prepared according to the method of U.S. Pat. No. 4,703,092. The copolymer had a molecular weight of 16,000 (aq.) and was 36 percent active. The copolymer was tested according to the procedure of Example 1 and showed a gypsum scale inhibition of 100 percent.

EXAMPLE 3

A poly(acrylic acid/acrylamide/N-tris(hydroxymethyl) methyl acrylamide) was prepared according to the method of U.S. Pat. No. 4,703,092. The copolymer had a molecular weight of 11,600 (aq.) and was 27.5 percent active. The copolymer was tested according to the procedures of Example 1 and exhibited 100 percent gypsum scale inhibition.

EXAMPLE 4

A 74/26 poly(acrylic acid/N-vinylpyrrolidone) was prepared by adding 21.7 grams of acrylic acid, 8.3 grams of N-vinylpyrrolidone and 267.0 grams of isopropanol to a reaction vessel. The monomer solution was heated to 82° C. reflux temperature with nitrogen purging. Aftr purging was complete 3.0 grams of t-butyl peroctoate was immediately added to the mixture and refluxing was continued for about 2.5 hours longer. The reaction mixture was left to cool, forming some precipitate. The entire reaction mixture including precipitate and solution was then concentrated on a rotary evaporator to form a fluffy white solid. Final drying was done in a vacuum oven at 1 mm Hg vacuum for three hours at 60° C. The procedure yielded a dry weight product of 34 grams. The product had a molecular weight of 5930 (aq.) and was 75.9 percent active. The copolymer was tested according to the procedures of Example 1 and showed a 99 percent gypsum scale inhibition.

EXAMPLE 5

A polymaleic anhydride known as Belgard EV available from Ciba Geigy was tested according to the procedures of Example 1. The polymaleic anhydride was reported to have 39.3 percent activity. When tested, the polymer exhibit 100 percent gypsum scale inhibition.

EXAMPLE 6

A copolymer of acrylic acid (80 mole percent) and isopropyl acrylate (20 mole percent) was prepared by adding 270 grams of a 16.7 percent monomer solution containing 32.3 grams acrylic acid and 12.72 gram isopropyl acrylate to a 1,500 ml reaction vessel. The monomer solution was heated to 60° C. with nitrogen purging over 15 minutes. An initiator solution comprising ammonium persulfate (5 percent based on monomer weight), added as a 30 percent solution, (7.5 grams) was added followed immediately by a sodium metabisulfite solution (15 percent based on monomer weight, added as a 30 percent solution, 22.5 grams). An exothermic reaction occurred immediately and the temperature was allowed to rise to 83° C. After about 12 minutes, the temperature fell to about 60° C. and was maintained at this level for about 2.5 hours longer. After this period, heating was stopped and the reaction mixture was cooled to room temperature. A slightly hazy solution resulted upon cooling. The molecular weight of the polymer was 15,000 (aq.) and the concentration of polymer solution was 15 percent. Residual acrylic acid was 60 ppm and residual isopropyl acrylate was 100 ppm.

The copolymer was tested according to the procedures of Example 1. The copolymer displayed a good gypsum scale inhibition greater than 95 percent.

EXAMPLE 7

A poly(acrylic acid/ethylacrylate) was prepared and tested according to the procedures of Example 1. The polymer showed a gypsum scale inhibition of 100 percent.

A second portion of the poly(acrylic acid/ethylacrylate) was blended at a 1:1 weight ratio with Dequest 2054, a phosphonate. The blend was tested according to the procedures of Example 1. In addition to pH 6, the blend was tested at pH levels of 4, 7.5, 9.5 and 11. At pH 4, 6 and 7.5, the blends showed 100 percent gypsum scale inhibition. At pH 9.5, the percent gypsum inhibition dropped to about 27 percent and at pH 11, fell to about 3 percent. The dosage of the polymer blend at the various pHs was 0.4 ppm/100 ppm calcium as calcium carbonate. Dequest 2054 above showed instability due to calcium phosphate precipitation beginning at pH 7.5. The blend provided better performance of higher pH.

EXAMPLE 8

A 60/40 acrylic acid/acrylamide copolymer was reacted with methoxypropylamine (MOPA) to modify the amide on the polymer backbone. 140 grams of a 35 percent polymer solution was mixed with 18.3 grams of MOPA in a 300 ml Parr reaction vessel. The reaction mixture was heated to 150° C. for 4 hours and allowed to cool. The subsequent copolymer was recovered and had a molecular weight of 4,800 (aq.) and 39 percent active. This polymer was tested according to the procedures of Example 1 and showed a gypsum scale inhibition greater than 95 percent.

135 grams of the acrylic acid/acrylamide copolymer used above was mixed with 23.53 grams MOPA in a 300 ml Parr reaction vessel. The reaction mixture was heated to 150° C. for 4 hours and allowed to cool. The copolymer was 41% active. The poly(acrylic acid/N-methoxypropyl acrylamide/acrylamide) was tested according to the procedures of Example 1 and found to have a gypsum scale inhibition greater than 95 percent.

EXAMPLE 9

An acrylic acid/acrylamide/N-methoxypropylamine acrylamide copolymer was blended with Dequest 2054, a phophonate, in a 1:1 weight ratio. The blend was tested according to the procedures of Example 1 at a dosage of 1/2000 and found to have a gypsum scale inhibition of 100 percent. When tested at a dosage of 1/2000 and a pH of 7.5, the blend was found to have a gypsum scale inhibition of about 59 percent.

Dequest 2054 alone was also tested according to the procedures of Example 1, at the same dosage and pH levels of 6.0 and 7.5. At pH 6.0, Dequest 2054 alone was found to have a gypsum scale inhibition of 100 percent. However, at pH 7.5, the Dequest 2054 alone was found to have a gypsum scale inhibition of only 44%. Accordingly, at the higher pH the phosphonate (Dequest 2054)-polymer blend showed significant improvement over phosphonate (Dequest 2054) alone.

EXAMPLE 10

An acrylic acid/N-propylamide/acrylamide copolymer was blended with Dequest 2054, a phosphanate, at a 1:1 weight ratio. The blend was tested according to the procedures of Example 1 in the same manner as described above in Example 9. At pH 6.0 the blend was found to have a gypsum scale inhibition of 100 percent while at pH 7.5 the blend had a gypsum scale inhibition of 91 percent. Accordingly, as in Example 9, the phosphonate-polymer blend at the higher pH exhibited a significantly greater gypsum scale inhibition than the phosphonate alone.

We claim:

1. A method for inhibiting the formation of gypsum scale in a flue gas desulfurization process which comprises contacting a sulfur-containing flue gas with an aqueous medium, comprising Gypsum in an amount between about 0.3 and about 30 weight percent said method comprising maintaining in the aqueous medium about 0.04 to about 120 ppm of an acrylate/acrylamide copolymer having the formula:

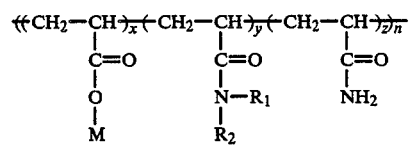

where $x+y+z=1$, x is between about 0.05 and about 0.95, y is between about 0.05 and about 0.95, and z is between about 0 and about 0.95; $R_1$ comprises H, an alkyl group containing from 1 to 4 carbon atoms, or $C_p(OH)_q$ where p is an integer from 1 to 4 and q is an integer from 1 to 3; $R_2$ comprises H or an alkyl group containing from 1 to 4 carbon atoms; n is an integer, sufficiently large in number so as to achieve a weight average molecular weight between about 1,000 to about 50,000; and M is H, an alkali metal, an alkaline earth metal, a transition metal, $NH_4$, a $C_1$–$C_4$ alkyl, or a mixture thereof.

2. The method of claim 1 wherein the pH of said aqueous medium is in the range of about 4.5 and about 11.

3. The method of claim 1 wherein the pH of said aqueous medium is in the range of about 4.5 and about 6.5.

4. The method of claim 1 wherein the temperature of said aqueous medium is between about 80° F. and about 150° F.

5. The method of claim 1 wherein the weight average molecular weight of said copolymer is between about 1,000 and about 50,000 as measured by gel permeation chromatography in water.

6. The method of claim 1 wherein said aqueous medium further comprises magnesium.

7. A method for inhibiting the formation of gypsum scale in a flue gas desulfurization process which comprises contacting a sulfur-containing flue gas with an aqueous medium, comprising Gypsum in an amount between about 0.3 and about 30 weight percent said method comprising maintaining in the aqueous medium about 0.04 to about 120 ppm of an acrylate copolymer having the formula:

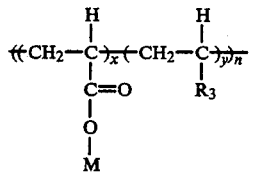

where $x+y=1$, x is between about 0.05 and about 0.95, and y is between about 0.05 and about 0.95; $R_3$ comprises OH or

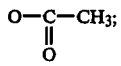

n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, and the like or mixture thereof.

8. The method of claim 7 wherein the pH of said aqueous medium is in the range of about 4.5 and about 11.

9. The method of claim 7 wherein the pH of said aqueous medium is in the range of about 4.5 and about 6.5.

10. The method of claim 7 wherein the temperature of said aqueous medium is between about 80° F. to about 150° F.

11. The method of claim 7 wherein the weight average molecular weight of said copolymer is between about 1,000 and about 50,000, as measured by gel permeation chromatography in water.

12. The method of claim 7 wherein said aqueous medium further comprises magnesium.

13. A method for inhibiting the formation of gypsum scale in a flue gas desulfurization process which comprises contacting a sulfur-containing flue gas with an aqueous medium, comprising Gypsum in an amount betewen about 0.3 and about 30 weight percent said method comprising maintaining in the aqueous medium about 0.04 to about 120 ppm of an acrylate ester/acrylic acid copolymer having the formula:

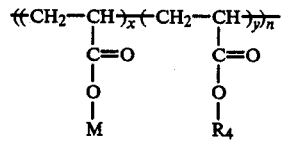

where $x+y=1$, x is bewween about 0.05 and about 0.95, and y is between about 0.05 and about 0.95; $R_4$ comprises $C_p(OH)_q$, where p is an integer from 1 to 4 and q is an integer from 1 to 3, or an alkyl group containing from 1 to 4 carbon atoms; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, or mixture thereof.

14. The method of claim 13 wherein the pH of said aqueous medium is in the range of about 4.5 and about 11.

15. The method of claim 13 wherein the pH of said aqueous medium is in the range of about 4.5 and about 6.5.

16. The method of claim 13 wherein the temperature of said aqueous medium is between about 80° F. to about 150° F.

17. The method of claim 13 wherein the weight average molecular weight of said copolymer is between about 1,000 and about 50,000, as measured by gel permeation chromatography in water.

18. The method of claim 13 wherein said aqueous medium further comprises magnesium.

19. A method for inhibiting the formation of gypsum scale in a flue gas desulfurization process which comprises contacting a sulfur-containing flue gas with an aqueous medium, comprising Gypsum in an amount between about 0.3 and about 30 weight percent said method comprising maintaining in the aqueous medium about 0.04 to about 120 ppm of an acrylic acid/maleate polymer having the formula:

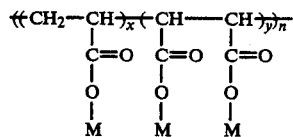

where $x+y=1$, x is between about 0.05 and about 0.95, and y is between about 0.05 and about 0.95; n is an integer, sufficiently large in number so as to achieve a weight average molecular weight between about 1,000 to about 50,000; and M is H, an alkali metal, an alkaline earth metal, a transition metal, $NH_4$, a $C_1$-$C_4$ alkyl, or mixture thereof.

20. The method of claim 9 wherein the pH of said aqueous medium is in the range of about 4.5 and about 11.0.

21. The method of claim 19 wherein the pH of said aqueous medium is in the range of about 4.5 and about 6.5.

22. The method of claim 19 wherein the temperature of said aqueous medium is between about 100° F. to about 140° F.

23. The method of claim 19 wherein the weight average molecular weight of said copolymer is between about 1,000 and about 50,000, as measured by gel permeation chromatography in water.

24. Tne method of claim 19 wherein said aqueous medium further comprises magnesium.

25. A method for inhibiting the formation of gypsum scale in a flue gas desulfurization process which comprises contacting a sulfur-containing flue gas with an aqueous medium, comprising Gypsum in an amount between about 0.3 and about 30 weight percent said method comprising maintaining in the aqueous medium about 0.2 to about 120 ppm of an acrylate/maleate terpolymer having the formula:

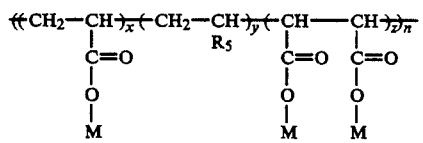

where $x+y+z=1$, x is between about 0.05 and about 0.95, y is between about 0.05 and about 0.95, and z is between about 0.05 and about 0.95; $R_5$ comprises OH, $OCOCH_3$, $CH(OH)CH_2CH_3$, $CH_2CH(OH)CH_3$, $CH_2CH_2CH_2OH$, or $C_p(OH)_q$ where p is an integer from 1 to 4 and q is an integer from 1 to 3; n is an integer, sufficiently large in number so as to achieve a weight average molecular weight between about 1,000 to about 50,000; and M is H, an alkali metal an alkaline earth metal, a transition metal, $NH_4$, a $C_1$–$C_4$ alkyl, and the like or mixture thereof.

26. The method of claim 25 wherein the pH of said aqueous medium is in the range of about 4.5 and about 11.

27. The method of claim 25 wherein the pH of said aqueous medium is in the range of about 4.5 and about 6.5.

28. The method of claim 25 wherein the temperature of said aqueous medium is between about 80° F. and about 150° F.

29. The method of claim 25 wherein the weight average molecular weight of said copolymer is between about 1,000 and about 50,000, as measured by gel permeation chromatography.

30. The method of claim 25 wherein said aqueous medium further comprises magnesium.

31. A method for inhibiting the formation of gypsum scale in a flue gas desulfurization process which comprises contacting a sulfur-containing flue gas with an aqueous medium comprising Gypsum in an amount between about 0.3 and about 30 weight percent having a pH in the range of about 4.5 to about 11, said method comprising maintaining in the aqueous medium about 0.04 to about 120 ppm of an inhibitor comprising a salt of hexamethylene diamine tetra(methylene phosphonic acid) and polymaleate.

32. The method of claim 31 wherein the temperature of said aqueous medium is between about 80° F. and about 150° F.

33. The method of claim 31 wherein the weight average molecular weight of said polymaleate is between about 1,000 and about 50,000 as measured by gel permeation chromatography in water.

34. The method of claim 31 wherein said aqueous medium further comprises magnesium.

35. A method for inhibiting the formation of gypsum scale in a flue gas desulfurization process which comprises contacting a sulfur-containing flue gas with an aqueous medium comprising Gypsum in an amount between about 0.3 and about 30 weight percent having a pH in the range of about 4.5 to about 11, said method comprising maintaining in the aqueous medium about 0.04 to about 120 ppm of an inhibitor comprising a salt of hexamethylene diamine tetra(methylene phosphonic acid) and an acrylic acid/ethylacrylate copolymer.

36. The method of claim 35 wherein the temperature of said aqueous medium is between about 80° F. and about 150° F.

37. The method of claim 35 wherein the weight average molecular weight of said copolymer is between about 1,000 and about 50,000 as measured by gel permeation chromatography in water.

38. The method of claim 35 wherein said aqueous medium further comprises magnesium.

39. A method for inhibiting the formation of gypsum scale in a flue gas desulfurization process which comprises contacting a sulfur-containing flue gas with an aqueous medium comprising Gypsum in an amount between about 0.3 and bout 30 weight percent having a pH in the range of about 4.5 to about 11, said method comprising maintaining in the aqueous medium about 0.04 to about 120 ppm of an inhibitor comprising a salt of hexamethylene diamine tetra(methylene phosphonic acid) and an acrylic acid/N-methoxypropyl acrylamide/acrylamide polymer.

40. The method of claim 39 wherein the temperature of said aqueous medium is between about 80° F. and about 150° F.

41. The method of claim 39 wherein the weight average molecular weight of said copolymer is between about 1,000 and about 50,000 as measured by gel permeation chromatography in water.

42. The method of claim 39 wherein said aqueous medium further comprises magnesium.

43. A method for inhibiting the formation of gypsum scale in a flue gas desulfurization process which comprises contacting a sulfur-containing flue gas with an aqueous medium comprising Gypsum in an amount between about 0.3 and about 30 weight percent having a pH in the range of about 4.5 to about 11, said method comprising maintaining in the aqueous medium about 0.04 to about 120 ppm of an inhibitor comprising a salt of hexamethylene diamine tetra(methylene phosphonic acid) and an acrylic acid/N-propyl acrylamide/acrylamide polymer.

44. The method of claim 43 wherein the temperature of said aqueous medium is between about 80° F. and about 150° F.

45. The method of claim 43 wherein the weight average molecular weight of said copolymer is between about 1,000 and about 50,000 as measured by gel permeation chromatography in water.

46. The method of claim 43 wherein said aqueous medium further comprises magnesium.

* * * * *